US012663131B2

(12) United States Patent
Chu

(10) Patent No.: US 12,663,131 B2
(45) Date of Patent: Jun. 23, 2026

(54) FLAME GENERATION ASSEMBLY AND SIMULATED FIREPLACE

(71) Applicant: Source Pro Industries Ltd., Kowloon Bay (HK)

(72) Inventor: Jackey Chu, Kowloon Bay (HK)

(73) Assignee: Source Pro Industries Ltd., Kowloon Bay (HK)

(*) Notice: Subject to any disclaimer, the term of this patent is extended or adjusted under 35 U.S.C. 154(b) by 0 days.

(21) Appl. No.: 19/098,055

(22) Filed: Apr. 2, 2025

(65) Prior Publication Data

US 2026/0063260 A1 Mar. 5, 2026

(30) Foreign Application Priority Data

Aug. 29, 2024 (CN) ........................ 202422114881.1

(51) Int. Cl.
*F21S 10/04* (2006.01)
*F21V 14/04* (2006.01)
*F21V 15/01* (2006.01)
*F21V 33/00* (2006.01)

(52) U.S. Cl.
CPC ............ *F21S 10/046* (2013.01); *F21V 14/04* (2013.01); *F21V 15/01* (2013.01); *F21V 33/0028* (2013.01)

(58) Field of Classification Search
CPC ........ F21S 10/04; F21S 10/043; F21S 10/046; F24C 7/004
See application file for complete search history.

(56) References Cited

U.S. PATENT DOCUMENTS

| | | | | |
|---|---|---|---|---|
| 6,162,047 A * | 12/2000 | Hess | F24C 7/004 | 126/512 |
| 6,393,207 B1 * | 5/2002 | Martin | F24C 7/004 | 40/431 |
| 2003/0072565 A1 * | 4/2003 | Ravnbo-West | F24C 7/004 | 40/431 |
| 2003/0156828 A1 * | 8/2003 | Jamieson | F24C 7/004 | 40/427 |
| 2004/0264949 A1 * | 12/2004 | Deng | F24C 7/004 | 392/348 |
| 2005/0063685 A1 * | 3/2005 | Bristow | F24C 7/004 | 392/348 |
| 2009/0231852 A1 * | 9/2009 | Vinter | F21V 21/15 | 362/276 |
| 2011/0261568 A1 * | 10/2011 | Dalsgaard | F21V 21/30 | 362/249.03 |
| 2012/0155075 A1 * | 6/2012 | Asofsky | F24C 7/004 | 362/231 |
| 2013/0258640 A1 * | 10/2013 | Lu | F21S 10/046 | 362/297 |
| 2015/0052791 A1 * | 2/2015 | Lu | F21S 10/046 | 40/428 |

(Continued)

*Primary Examiner* — Zheng Song
*Assistant Examiner* — James M Endo
(74) *Attorney, Agent, or Firm* — Sisson & Banyas, Attorneys at Law, LLC; Edwin A. Sisson

(57) ABSTRACT

A flame generation assembly having a reflecting device, a driving mechanism and a light source. The reflecting device at least includes a first reflecting shaft and a second reflecting shaft which are rotatably provided, on the first reflecting shaft and the second reflecting shaft are provided with reflecting parts, the first reflecting shaft and the second reflecting shaft are simultaneously driven by the driving mechanism to rotate.

10 Claims, 6 Drawing Sheets

(56) References Cited

U.S. PATENT DOCUMENTS

| | | | | |
|---|---|---|---|---|
| 2015/0338105 | A1* | 11/2015 | Lu | F21S 10/046 40/428 |
| 2016/0281943 | A1* | 9/2016 | Chen | F21V 23/009 |
| 2017/0328575 | A1* | 11/2017 | Crowe | F24C 7/004 |
| 2018/0363870 | A1* | 12/2018 | Jones | F24C 7/004 |
| 2019/0137059 | A1* | 5/2019 | Zhou | F24B 1/1808 |
| 2019/0293297 | A1* | 9/2019 | Baird | G09F 19/16 |
| 2020/0166213 | A1* | 5/2020 | Lu | F24B 1/1808 |
| 2022/0010965 | A1* | 1/2022 | Lu | F24C 7/081 |
| 2023/0139825 | A1* | 5/2023 | Baird | F24C 3/006 392/348 |
| 2023/0175660 | A1* | 6/2023 | Lassen | F21S 10/046 362/234 |
| 2024/0027042 | A1* | 1/2024 | Zhou | F21S 10/046 |

* cited by examiner

FLAME GENERATION ASSEMBLY AND SIMULATED FIREPLACE

TECHNICAL FIELD

The present disclosure relates to a flame generation assembly and a simulated fireplace.

BACKGROUND

Existing fireplaces generally display dynamic flame effects by means of flame generation assemblies, which are generally formed by piecing together a plurality of parts and usually includes a light source, a driving device and a reflecting member, the driving device is utilized to drive the reflecting member to rotate and reflect light emitted from the light source onto a projection screen, and then to combine with a fake firewood assembly placed in front of the projection screen, so as to display different visual effects. Existing flame generation assemblies usually do not have an integrated structure, and usually have a large number of parts and components, which are cumbersome to assemble and transport, also with high cost.

SUMMARY

An object of the present disclosure is to provide a flame generation assembly and a simulated fireplace to overcome the deficiencies in the prior art, aiming to improve the unreasonable structure of the existing flame generation assembly.

In one respect, the present disclosure relates to a flame generation assembly comprising a reflecting device, a driving mechanism and a light source, wherein the reflecting device at least comprises a first reflecting shaft and a second reflecting shaft which are rotatably provided, on the first reflecting shaft and the second reflecting shaft are provided with reflecting parts, the first reflecting shaft and the second reflecting shaft are driven by the driving mechanism to rotate simultaneously.

Preferably, the flame generation assembly further comprises a simulation fake firewood and a fake firewood bottom ash; the simulation fake firewood is provided above the fake firewood bottom ash, the reflecting device is provided below the simulation fake firewood, and the light source is configured to project light onto at least one of the simulation fake firewood and the fake firewood bottom ash by means of the reflecting device. Wherein, the flame generation assembly may comprise a base panel, the light source comprises a flame light and a bottom ash light, the flame light and the bottom ash light are disposed on the base panel respectively.

Preferably, the driving mechanism comprises a motor, a driven roller, a driving roller and a conveyor belt; the output end of the motor is connected to the first reflecting shaft to drive the first reflecting shaft to rotate; the driving roller is disposed on the first reflecting shaft and is capable of rotating together with the first reflecting shaft; the driven roller is disposed on the second reflecting shaft and is capable of rotating with the second reflecting shaft; the conveyor belt is provided on the driven roller and the driving roller, respectively, and is configured to drive the driven roller to rotate through the driving roller.

Preferably, wherein mounting brackets are provided on each side of the fake firewood bottom ash, both of the reflecting device and the driving mechanism are arranged on the mounting brackets.

Preferably, mounting brackets may be provided on each side of the false firewood bottom ash, and the motor is set on the mounting brackets. The simulation flame assembly may further comprise a flame panel, the ends of the flame panel may be provided on the mounting bracket, the flame panel may be provided at the rear side of the reflecting device.

Preferably, the simulation flame assembly further comprises a front panel, the front panel is disposed at the front side of the fake firewood bottom ash and connected to the bottom panel to form a modular assembly.

Wherein, the conveyor belt may be a teethed belt, the driven roller and the driving roller are provided with meshing teeth that intermesh with the teethed belt. The conveyor belt may also be provided with a tensioning assembly, the tensioning assembly comprises a tensioning wheel, a tensioning bracket and a tensioning spring, the tensioning wheel is fixed to a tensioning bracket, one end of the tensioning bracket is fixed to a mounting bracket, the other end of the tensioning bracket is connected to the tensioning spring, the other end of the tensioning spring is fixedly mounted to the mounting bracket.

In another respect, the present disclosure relates to a simulated fireplace comprising a flame generation assembly, wherein the flame generation assembly is the flame generation assembly as described above.

Preferably, the simulated fireplace further comprises a housing frame, the front side of the housing frame is a door frame assembly, the rear side of the housing frame is a rear panel, the flame generation assembly is disposed in the housing frame.

Preferably, the housing frame is provided with a fan mounting panel, the fan mounting panel is set on top of the flame generation assembly and forms a cavity between with the top panel of the housing frame; the simulated fireplace further comprises a fan assembly, the fan assembly is set on the fan mounting panel and located within the cavity. Wherein, the simulated fireplace may further comprise a main control board and a display board, the display board may be provided on the housing frame and may be electrically connected to the main control board, the main control board may be electrically connected to the light source.

The flame generation assembly and the simulated fireplace according to the present disclosure have a reasonable and compact structural configure, which are easy to assemble with low cost and capable of realizing a dynamic flame effect. The specific technical advantages are listed as below:

(1) The flame generation assembly of the present disclosure is modularly designed so that the structure of the flame generation assembly is reasonable and compact, which could minimize the size of the flame generation assembly, while realizing realistic flame simulation effects, enabling modular assembly in the factory and reducing cost for installation, packaging and transportation;

(2) By providing at least two reflecting shafts to realize the simulated light projection of flame and bottom ash respectively and form dynamic simulation of flame and bottom ash, which could make the structure be reasonable and compact and be convenient for assembly and usage; in particular, the reflecting shafts can be arranged in high and low positions, and it is more capable of realizing an undulating flame effect;

(3) By setting a flame panel at the rear side of the reflecting device, light can be irradiated to the reflecting parts and then reflected through the flame panel in order to be projected on the rear panel or screen of the simulated fireplace to form a simulated dynamic flame.

BRIEF DESCRIPTION OF THE DRAWINGS

The present disclosure is described in further detail below in conjunction with the accompanying drawings and specific embodiments.

DETAILED DESCRIPTION

Figure 1:
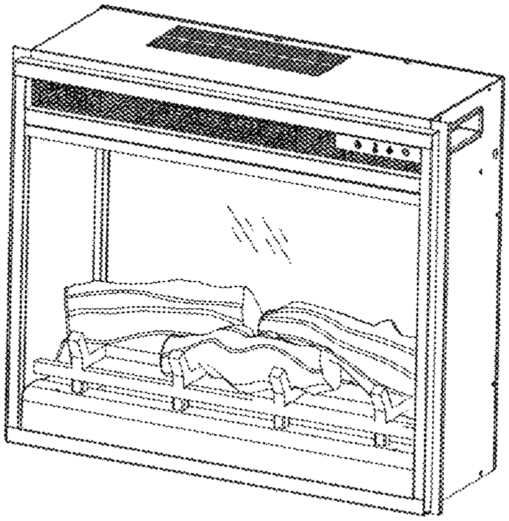
FIG. 1 is a schematic view of the overall structure of a simulated fireplace in the present disclosure.

In order to make the objectives, technical solutions and advantages of the present disclosure clearer, the embodiments of the present disclosure will be described below in detail with reference to the accompanying drawings. The different embodiments, in particular the technical features in different embodiments, of the present disclosure may be combined with each other if not conflicted.

It should be noted that when an element is the to be "fixed to" or "provided on" another element, it may be directly or indirectly fixed to or provided on the element. When an element is the to be "attached" to another element, it may be attached directly or indirectly to the element.

Furthermore, the terms "first" and "second" are used for descriptive purposes only and are not to be understood as indicating or implying relative importance or implicitly specifying the number of technical features indicated. As a result, a feature defined with the terms "first" and "second" may expressly or impliedly include one or more such features. Unless otherwise expressly limited, in the description of the present disclosure, "more than one" means two or more than two, and "several" means one or more than one.

In the description of the present disclosure, it is to be understood that the terms "top", "bottom", "front", "back", "left", 'right' and the like indicate orientations or positional relationships based on those shown in the accompanying drawings, and are only intended to facilitate and simplify the description, and do not indicate or imply that the device or element referred to must have a particular orientation, be configured and operated in a particular orientation, and therefore cannot be construed as an indication of a particular orientation of the device or element referred to and therefore cannot be construed as an indication of a particular orientation of the device or element referred to and operated, and therefore is not to be construed as a limitation of the present disclosure.

In the description of the present disclosure, it is to be noted that, unless otherwise expressly provided and limited, the terms "mounted", "attached", "connected" are to be broadly construed, e.g., it may be a fixed connection or a detachable connection. For example, it may be a fixed connection, a removable connection, or a connection in one piece; it may be a mechanical connection or an electrical connection; it may be a direct connection or an indirect connection through an intermediate medium; it may be a connection within two elements or an interaction between two elements. For a person of ordinary skill in the art, the specific meaning of the above terms in the present disclosure may be understood on a case-by-case basis.

As shown in FIGS. 1 to 5, the present disclosure provides a flame generation assembly 1 comprising a simulation fake firewood 12, a fake firewood bottom ash 14, a reflecting device, a driving mechanism, a light source, and a base panel 15, wherein the fake firewood bottom ash 14 is disposed on the base panel 15, and the fake firewood bottom ash 14 and the base panel 15 may be separate components or integrated components. Preferably, the fake firewood bottom ash 14 may be provided with a fake firewood rack 13, and the simulation fake firewood 12 is provided on the fake firewood rack 13. The reflecting device may be provided below the simulation fake firewood 12. The fake firewood bottom ash 14 may be a blister component, within the internal of which is provided with an accommodating cavity, and the reflecting device may also be provided in the accommodating cavity. The reflecting device may comprise a reflecting part such as a reflecting blade, which is rotated by a driving mechanism. Reflecting light is formed on the reflecting blades by irradiation of a light source, and the combination of the reflecting light and the simulation fake firewood forms a simulation flame burning effect. Through the modular design described above, the present disclosure makes the structural configure of the flame generation assembly reasonable and compact, minimizes the size of the flame generation assembly while realizing a realistic flame simulation effect, which enables modular assembly in the factory and reduces the cost for installation, packaging and transportation.

As shown in FIGS. 1 to 5, the reflecting device comprises a first reflecting shaft 17 and a second reflecting shaft 18. Preferably, the two shafts can be set in high and low positions, i.e., can be set respectively at different heights, and reflecting parts can be provided on the first reflecting shaft 17 and the second reflecting shaft 18 respectively, for example, in a form of reflecting blades. Specifically, the first reflecting shaft 17 and the second reflecting shaft 18 can be rotated around a horizontal axis and be provided below the fake firewood bottom ash 14. By driving the reflecting blades to rotate, so as to form an undulating flame effect when the light is projected. It is known to those skilled in the art that the number of reflecting shafts of the present disclosure may also be more than two, without being limited by the embodiments in the accompanying drawings.

The light source of the present disclosure may comprise a flame light 25 and a bottom ash light 26, the flame light 25 and the bottom ash light 26 may be LED lights and are respectively provided on the base panel 15. Specifically, the flame light 25 may be disposed at a rear portion of the base panel 15, and the bottom ash light 26 may be disposed at a front portion of the base panel 15. Further, the flame light 25 may be disposed at the rear of or below the first reflecting shaft 17, so that the light of the flame light 25 can be refracted after irradiating the reflecting blade of the first reflecting shaft 17; the bottom ash light 26 may be disposed at the rear of or below the second reflecting shaft 18, so that the light of the bottom ash light 26 can be refracted after irradiating the reflecting blade of the second reflecting shaft

18, or vice versa. The flame generation assembly provided in this disclosure is modularly assembled to form an integrated structure, and by designing two reflecting shafts with different heights to realize simulation light projection of flame and bottom ash respectively, forming dynamic simulation flame and bottom ash, the structure is reasonably designed and compact, and is convenient for assembly and usage.

Figure 3:
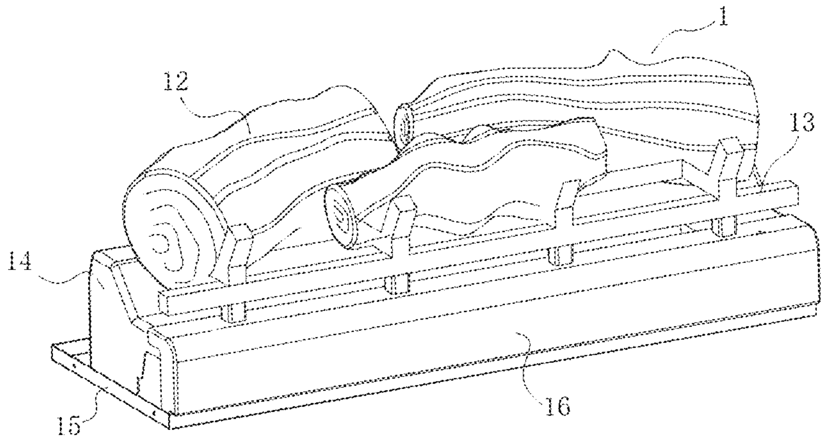
FIG. 3 shows a schematic view of a simulation flame assembly of the present disclosure.
Figure 4:
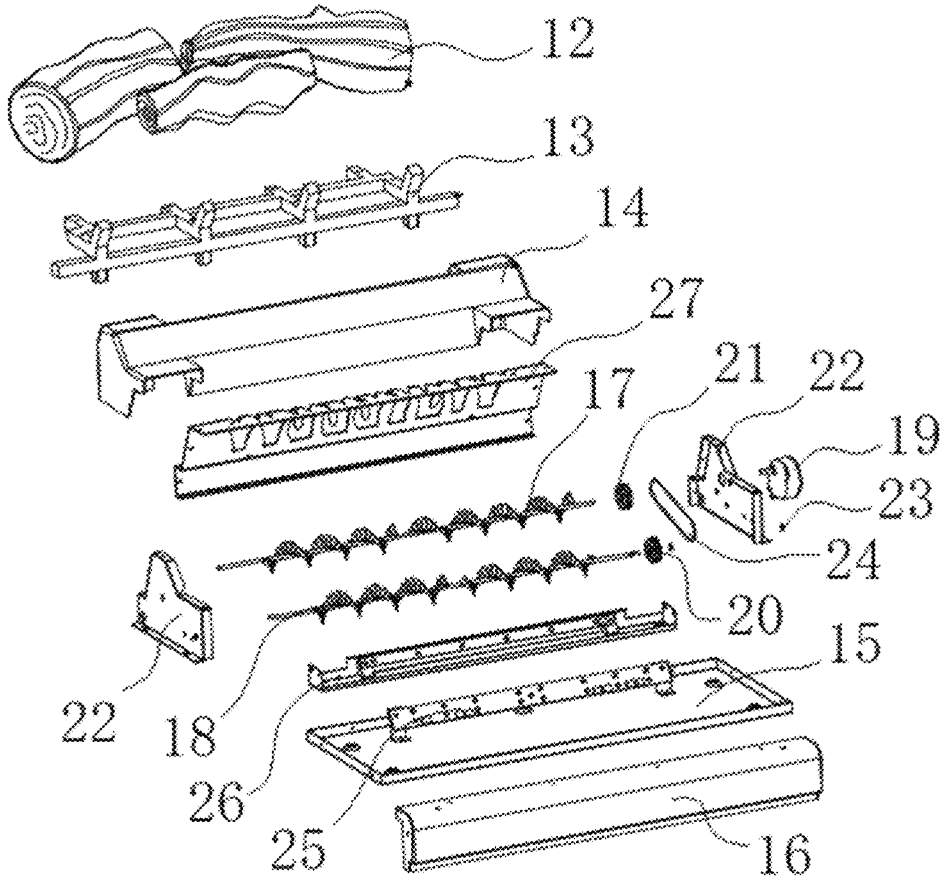
FIG. 4 shows an exploded view of the simulation flame assembly of the present disclosure.
Figure 5:
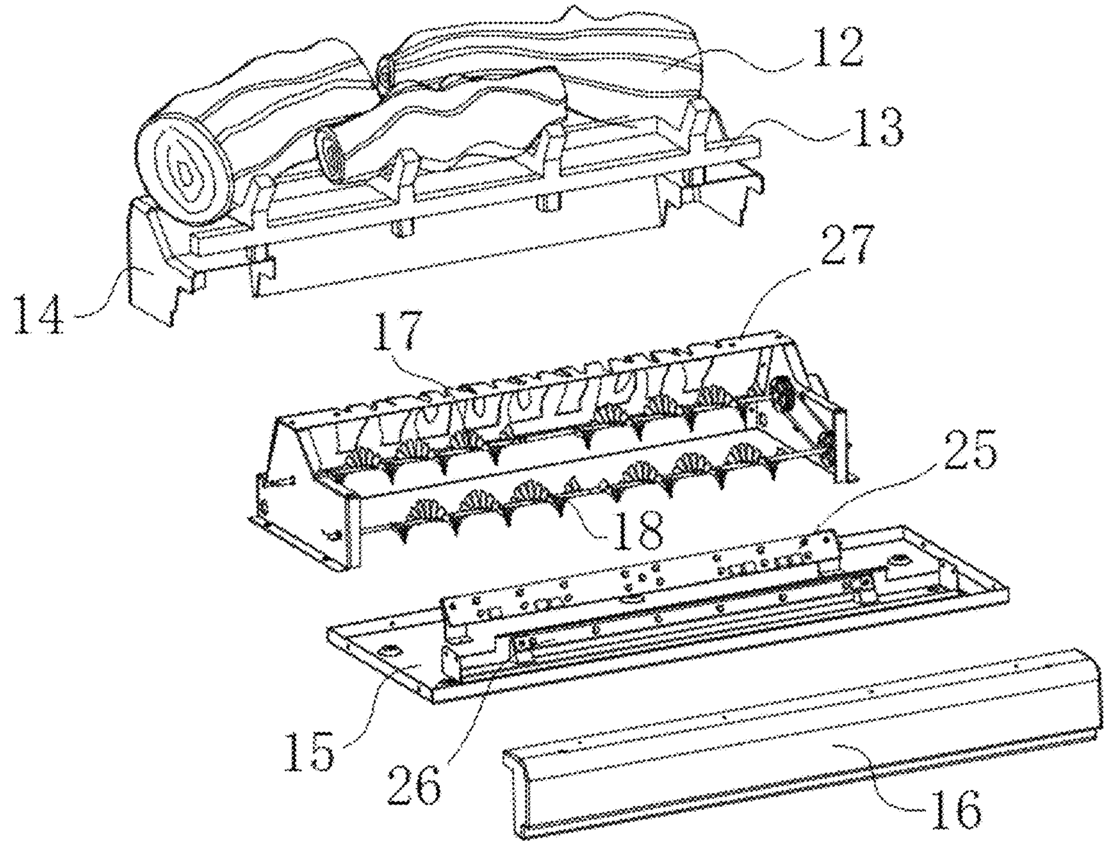
FIG. 5 shows another exploded view of the simulation flame assembly of the present disclosure.

Preferably, in combination with the above solution, as shown in FIGS. 3 to 5, a plurality of reflecting blades are helically distributed on the reflecting shaft, so that the light from the flame light 25 and the bottom ash light 26 can be irradiated onto the reflecting blades of the reflecting shaft, and can be rotated along with the reflecting blades of the reflecting shaft to form a high and low undulating flame effect as well as a dynamic bottom ash effect when being projected.

Preferably, in combination with the above embodiment, as shown in FIGS. 3 to 5, the simulation flame assembly 1 further comprises a driving mechanism. Specifically, a mounting bracket 22 is provided on each side of the fake firewood bottom ash 14, and both ends of the reflecting shaft are rotationally provided on the mounting bracket 22 around a horizontal axis. Further, the driving mechanism is also provided on the mounting bracket 22 and is drivably connected to the reflecting shaft to simultaneously drive the first reflecting shaft 17 and the second reflecting shaft 18 to rotate around the horizontal axis. In this embodiment, by designing a driving mechanism to simultaneously drive the first reflecting shaft 17 and the second reflecting shaft 18 with different heights to rotate, a fabulous dynamic flame effect can be realized. Also, such a design with a single driving mechanism can reduce the cost of manufacturing material.

Preferably, in combination with the above embodiment, as shown in FIGS. 3 to 5, the driving mechanism comprises a motor 19, a driven roller 20, a driving roller 21, and a conveyor belt 24. Wherein the motor 19 is only to be provided with one. The motor 19 may be provided on the outside of the mounting bracket 22 to avoid interfering with the reflecting shaft when rotating. The output end of the motor 19 is connected to the first reflecting shaft 17 to drive the first reflecting shaft 17 to rotate. Further, the output end of the motor 19 is connected to the driving roller 21, which is connected to the first reflecting shaft 17 and is capable of rotating together with the first reflecting shaft 17. The driven roller 20 is connected to the second reflecting shaft 18 and is capable of rotating together with the second reflecting shaft 18. The conveyor belt 24 is provided between the driven roller 20 and the driving roller 21 to drive the driven roller 20 to rotate by rotation of the driving roller 21. The driving mechanism provided in this embodiment operates through one single motor 19 to drive the first reflecting shaft 17 and the driving roller 21 to rotate, and the driving roller 21 drives the driven roller 20 and the second reflecting shaft 18 to rotate through the conveyor belt 24, realizing that a single motor drives the first reflecting shaft 17 and the second reflecting shaft 18 to rotate simultaneously, which could save the energy and material costs.

Preferably, in combination with the above embodiment, as shown in FIGS. 4 to 5, the simulation flame assembly 1 further includes a flame panel 27, and the two ends of the flame panel 27 can be separately provided on the mounting bracket 22 and located on the side of the first reflecting shaft 17, so as to enable the light of the flame light 25 to be irradiated to the reflecting blade of the first reflecting shaft 17 and then refracted through the flame panel 27, so that it can be projected on the back panel or screen of the simulated fireplace to form a simulated dynamic flame.

Preferably, in combination with the above embodiment, as shown in FIGS. 3 to 5, the simulation flame assembly 1 further comprises a front panel 16, which is provided at the front side of the fake firewood bottom ash 14 and connected to the bottom panel 15, so as to wrap the whole fake firewood bottom ash 14 to form an integral structure. Further, the second reflecting shaft 18 may be rotationally set on the mounting bracket 22 by means of an E-type card spring 23. The bottom ash light 26 may be set below the second reflecting shaft 18, so that the light emitted by the bottom ash light 26 is irradiated to the reflecting blade of the second reflecting shaft 18 and then refracted onto the fake firewood rack 13 and the fake firewood bottom ash 14, forming a bright dynamic flame.

Accordingly, in combination with the above-described scheme, as shown in FIGS. 1 to 5, the present disclosure also provides a simulated fireplace comprising a flame generation assembly, the flame generation assembly being the flame generation assembly described above. The flame generation assembly adopting the above-described integral design is capable of being directly installed, which is convenient to use and with reduced cost.

Figure 2:
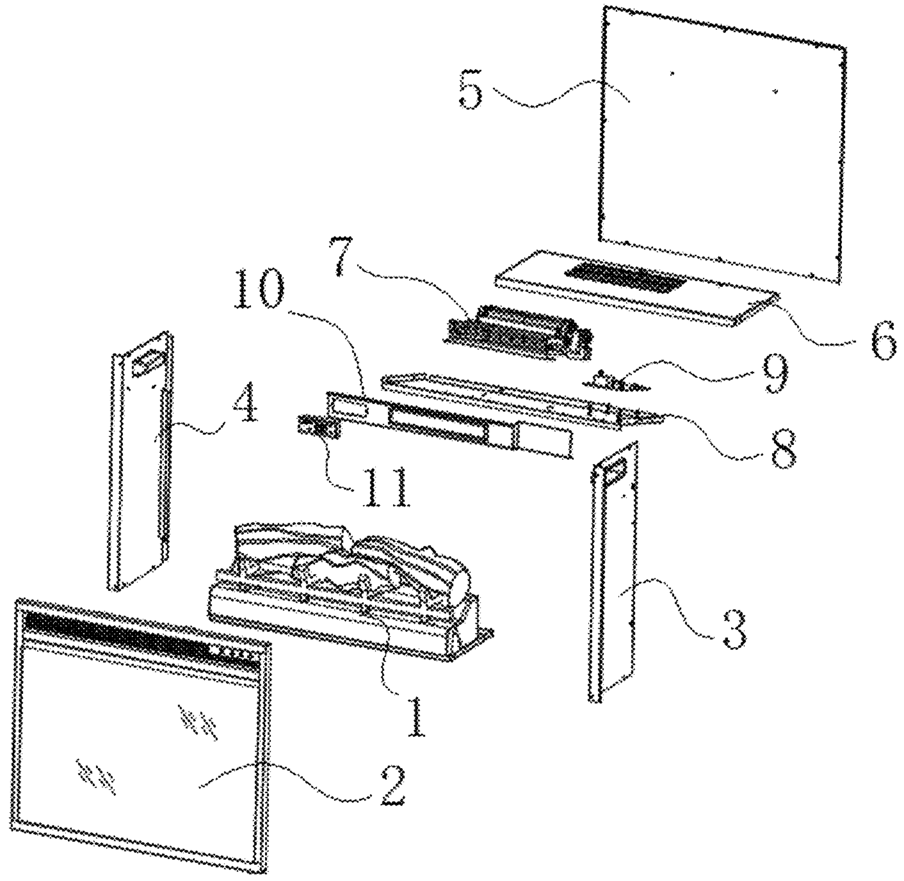
FIG. 2 is an exploded view of the simulated fireplace in the present disclosure.

Preferably, in combination with the above-described program, as shown in FIGS. 1 to 2, the simulated fireplace further comprises a housing frame, which is a rectangular structure, with a glass door frame assembly 2 at the front side of the housing frame and a rear panel 5 at the rear side of the housing frame. The flame generation assembly can be directly set at the bottom within the housing frame. Specifically, the light of the flame light 25 is able to irradiate the reflecting blade of the first reflecting shaft 17 and then refract through the flame panel 27, thereby projecting on the rear panel 5 or the screen to form a simulated dynamic flame. The light of the bottom ash light 26 can be irradiated to the reflecting blade of the second reflecting shaft 18 and then refracted onto the fake firewood rack 13 and the fake firewood bottom ash 14, forming a simulation flame bottom ash. With the above solution, the simulation flame assembly 1 simulates the effect of burning wood and heating air for the purpose of decorating and heating the room.

Preferably, in combination with the above-described scheme, as shown in FIGS. 1 to 2, the housing frame is a modular assembly. That is, the front side of the housing frame is a glass door frame assembly 2, the rear side of the housing frame is a rear panel 5, the left side of the housing frame is a left panel assembly 4, the right side of the housing frame is a right panel assembly 3, and the top of the housing frame is a top panel 6. The top panel 6 is provided with a plurality of through holes for a ventilation. The housing frame is provided with a blower fixing plate 8, which is provided at the top of the flame generation assembly and forms a cavity between the top panel 6. The simulated fireplace may further comprise a fan assembly 7 and an air guide panel 10, the fan assembly 7 could be provided on the fan fixing plate 8 and located within the cavity. An air outlet is provided on the side of the housing frame, and the air guide panel 10 is swingably disposed within the air outlet of the housing frame to direct the heated air into the room.

Preferably, in combination with the above embodiment, as shown in FIGS. 1 to 2, the simulated fireplace further includes a main control board 9, a display board 11, and a power supply module. Specifically, the display board 11 is provided on the housing frame and is electrically connected to the main control board 9. The power supply module is electrically connected to the main control board 9 to supply the electrical energy. Further, the main control board 9 is also electrically connected to the flame light 25 and the bottom ash light 26, respectively.

Figure 6:
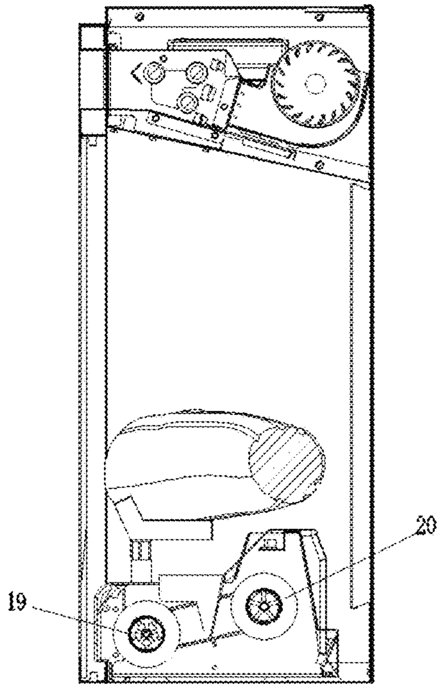
FIG. 6 shows a preferred embodiment of the simulated fireplace of the present disclosure.
Figure 7:
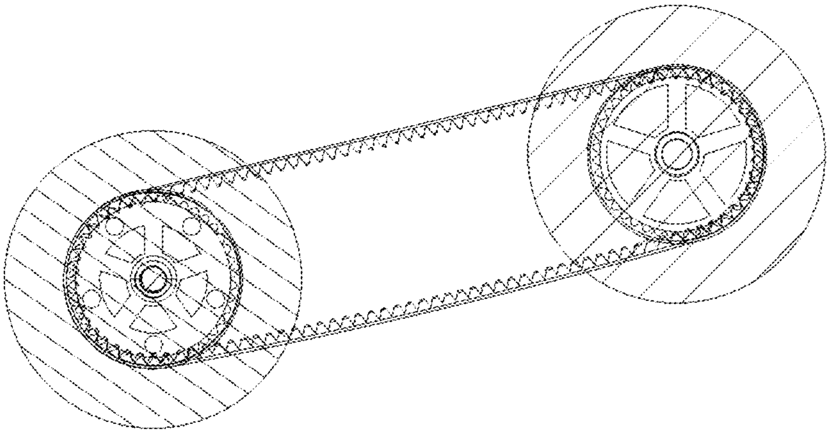
FIG. 7 shows a schematic view of the conveyor belt shown in FIG. 6.

After a long period of use, the conveyor belt may deform and become slack, and in order to avoid the occurrence of the conveyor belt slipping phenomenon. As shown in FIGS. 6-7, wherein a preferred embodiment of the conveyor belt is shown. In FIGS. 6-7, the driven roller 20 and the driving roller 21 are fixed to the mounting bracket 22. The conveyor belt 24 is a teethed belt, and the driven roller 20 and the driving roller 21 are provided with engaging teeth that can engage with the teethed belt. Through the engagement of the teethed belt and the engaging teeth, the purpose of preventing slippage can be realized.

Figure 8:
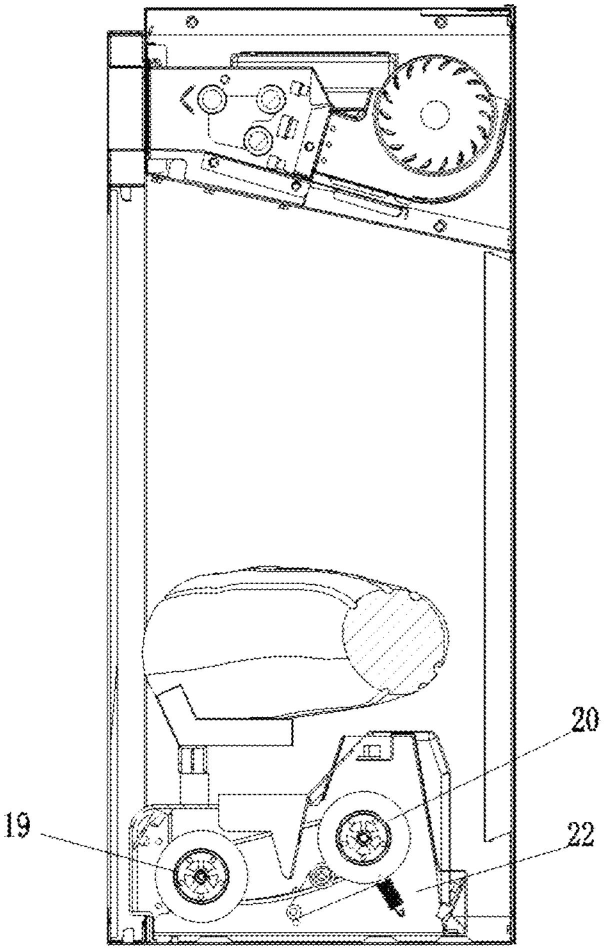
FIG. 8 shows another preferred embodiment of the simulated fireplace of the present disclosure.
Figure 9:
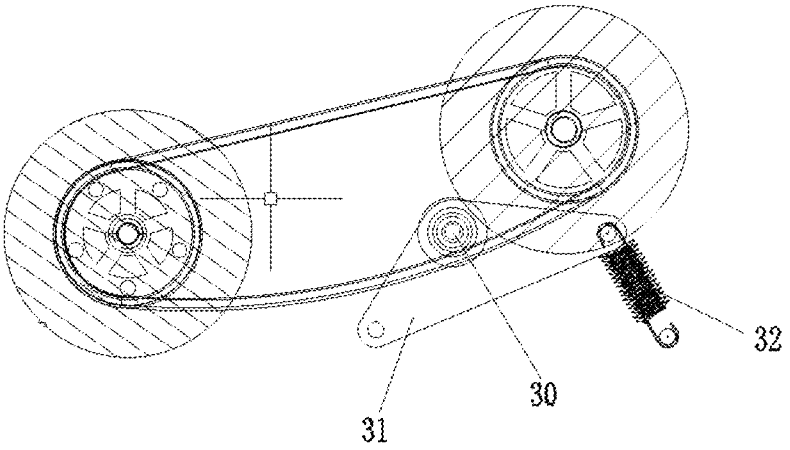
FIG. 9 shows a schematic view of the conveyor belt shown in FIG. 8.

As shown in FIGS. 8-9, another preferred embodiment of the conveyor belt is shown. In FIGS. 8-9, the belt can also be tensioned by providing a tensioning assembly on the conveyor belt 24. Specifically, the tensioning assembly comprises a tensioning wheel 30, a tensioning bracket 31 and a tensioning spring 32. Wherein, the tensioning wheel 30 is fixed onto the tensioning bracket 31 and arranged on the conveyor belt 24. One end of the tensioning bracket 31 may be screwed to the mounting bracket 22, and the other end of the tensioning bracket 31 is connected to an end of the tensioning spring 32. The other end of the tensioning spring 32 is fixedly mounted to the mounting bracket 22. The present disclosure pulls the tensioning bracket 31 by the tensioning spring 32, thereby driving the tensioning wheel 30 and applying tension to the conveyor belt 24, so that the conveyor belt 24 can always be in a state of tension to avoid slipping.

The flame generation assembly and fireplace designed in the present disclosure have a reasonable and compact structure, being easily assembled and with a relatively low cost, which are capable of realizing a dynamic flame effect for the purpose of decoration and heating.

Although the embodiments of the present disclosure are described above, the contents described are only embodiments to easily understand the present disclosure and not intended to limit the present disclosure. Without departing from the spirit and scope disclosed by the present disclosure, any person skilled in the art to which the application belongs can make any modifications and alterations to the forms and details of implementation. However, the protection scope of the present disclosure shall still be subject to the scope defined by the appended claims.

The invention claimed is:

1. A flame generation assembly comprising:

a reflecting device, a driving mechanism, a light source, a simulation fake firewood, a fake firewood bottom ash, a flame panel, two mounting brackets, a base panel, and a front panel;

wherein the reflecting device further comprises a first reflecting shaft and a second reflecting shaft which are rotatably provided, on the first reflecting shaft and the second reflecting shaft are provided reflecting parts, and the first reflecting shaft and the second reflecting shaft are capable of being simultaneously driven by the driving mechanism to rotate;

wherein the driving mechanism comprises a motor, a driven roller, a driving roller and a conveyor belt; the output end of the motor is connected to the first reflecting shaft to drive the first reflecting shaft to rotate; the driving roller is disposed on the first reflecting shaft and is capable of rotating together with the first reflecting shaft; the driven roller is disposed on the second reflecting shaft and is capable of rotating with the second reflecting shaft; the conveyor belt is provided on the driven roller and the driving roller respectively, and is configured to drive the driven roller to rotate with the driving roller;

wherein the light source comprises a flame light and a bottom ash light, the flame light and the bottom ash light are disposed on the base panel respectively;

wherein the mounting brackets are provided on each side of the fake firewood bottom ash, the reflecting device is arranged on the mounting brackets, and the driving mechanism and the motor are set on one of the mounting brackets;

wherein the conveyor belt is a teethed belt, and the driven roller and the driving roller are provided with meshing teeth that intermesh with the teethed belt;

wherein the conveyor belt is provided with a tensioning assembly, the tensioning assembly comprises a tensioning wheel, a tensioning bracket and a tensioning spring, the tensioning wheel is fixed to the tensioning bracket, one end of the tensioning bracket is fixed to one of the mounting brackets, the other end of the tensioning bracket is connected to the tensioning spring, the other end of the tensioning spring is fixedly mounted to one of the mounting brackets;

wherein the simulation fake firewood is provided above the fake firewood bottom ash, the reflecting device is provided below the simulation fake firewood, and the light source is configured to project light onto at least one of the simulation fake firewood and the fake firewood bottom ash by means of the reflecting device;

wherein the ends of the flame panel are provided on the mounting brackets, and the flame panel is provided at the rear side of the reflecting device; and wherein the front panel is disposed at the front side of the fake firewood bottom ash and connected to the bottom panel to form a modular assembly.

2. A simulated fireplace comprising:

a reflecting device, a driving mechanism, a light source, a simulation fake firewood, a fake firewood bottom ash, a flame panel, two mounting brackets, a housing frame, a base panel, a front panel, a rear panel, a fan mounting panel, a fan assembly, a main control board, and a display board;

wherein the reflecting device further comprises a first reflecting shaft and a second reflecting shaft which are rotatably provided, on the first reflecting shaft and the second reflecting shaft are provided reflecting parts, and the first reflecting shaft and the second reflecting shaft are capable of being simultaneously driven by the driving mechanism to rotate;

wherein the driving mechanism comprises a motor, a driven roller, a driving roller and a conveyor belt; the output end of the motor is connected to the first reflecting shaft to drive the first reflecting shaft to rotate; the driving roller is disposed on the first reflecting shaft and is capable of rotating together with the first reflecting shaft; the driven roller is disposed on the second reflecting shaft and is capable of rotating with the second reflecting shaft; the conveyor belt is provided on the driven roller and the driving roller respectively, and is configured to drive the driven roller to rotate with the driving roller;

wherein the light source comprises a flame light and a bottom ash light, the flame light and the bottom ash light are disposed on the base panel respectively;

wherein the mounting brackets are provided on each side of the fake firewood bottom ash, the reflecting device is arranged on the mounting brackets, and the driving mechanism and the motor are set on one of the mounting brackets;

wherein the conveyor belt is a teethed belt, and the driven roller and the driving roller are provided with meshing teeth that intermesh with the teethed belt;

wherein the conveyor belt is provided with a tensioning assembly, the tensioning assembly comprises a tensioning wheel, a tensioning bracket and a tensioning spring, the tensioning wheel is fixed to the tensioning bracket, one end of the tensioning bracket is fixed to one of the mounting brackets, the other end of the tensioning bracket is connected to the tensioning spring, the other end of the tensioning spring is fixedly mounted to one of the mounting brackets;

wherein the simulation fake firewood is provided above the fake firewood bottom ash, the reflecting device is provided below the simulation fake firewood, and the light source is configured to project light onto at least one of the simulation fake firewood and the fake firewood bottom ash by means of the reflecting device;

wherein the ends of the flame panel are provided on the mounting brackets, and the flame panel is provided at the rear side of the reflecting device; and wherein the front panel is disposed at the front side of the fake firewood bottom ash and connected to the bottom panel;

wherein the front side of the housing frame is the front panel, said front panel being a door frame assembly, the rear side of the housing frame is the rear panel, the flame generation assembly is disposed in the housing frame;

wherein the fan mounting panel is set on top of the flame generation assembly and forms a cavity between with the top panel of the housing frame, and the fan assembly is set on the fan mounting panel and located within the cavity; and wherein the display board is provided on the housing frame and is electrically connected to the main control board, and the main control board is electrically connected to the light source.

3. A flame generation assembly comprising:

a reflecting device, a driving mechanism, a light source, a fake firewood bottom ash, mounting brackets, a base panel, and a front panel;

wherein the reflecting device further comprises a first reflecting shaft and a second reflecting shaft which are rotatably provided, on the first reflecting shaft and the second reflecting shaft are provided reflecting parts, and the first reflecting shaft and the second reflecting shaft are capable of being simultaneously driven by the driving mechanism to rotate;

wherein the driving mechanism consists of one motor, a driven roller, a driving roller and one conveyor belt; the output end of the motor is connected to the first reflecting shaft to drive the first reflecting shaft to rotate; the driving roller is disposed on the first reflecting shaft and is capable of rotating together with the first reflecting shaft; the driven roller is disposed on the second reflecting shaft and is capable of rotating with the second reflecting shaft; the conveyor belt is provided on the driven roller and the driving roller respectively, and is configured to drive the driven roller to rotate with the driving roller;

wherein the mounting brackets consist of two mounting brackets which are provided on each side of the fake firewood bottom ash, the reflecting device is arranged on the mounting brackets, and the driving mechanism and the motor are set on one of the mounting brackets;

wherein the conveyor belt is provided with a tensioning assembly, the tensioning assembly consists of one tensioning wheel, a tensioning bracket and a tensioning spring, the tensioning wheel is fixed to the tensioning bracket, one end of the tensioning bracket is fixed to one of the mounting brackets, the other end of the tensioning bracket is connected to the tensioning spring, the other end of the tensioning spring is fixedly mounted to one of the mounting brackets; and wherein the front panel is disposed at the front side of the fake firewood bottom ash and connected to the bottom panel to form a modular assembly.

4. The flame generation assembly according to claim 3, further comprising:

a simulation fake firewood;

wherein the light source comprises a flame light and a bottom ash light, the flame light and the bottom ash light are disposed on the base panel respectively; and wherein the simulation fake firewood is provided above the fake firewood bottom ash, the reflecting device is provided below the simulation fake firewood, and the light source is configured to project light onto at least one of the simulation fake firewood and the fake firewood bottom ash by means of the reflecting device.

5. The flame generation assembly according to claim 4, further comprising:

a flame panel;

wherein the ends of the flame panel are provided on the mounting brackets, and the flame panel is provided at the rear side of the reflecting device.

6. The flame generation assembly according to claim 5, wherein the conveyor belt is a teethed belt, and the driven roller and the driving roller are provided with meshing teeth that intermesh with the teethed belt.

7. The flame generation assembly according to claim 4, wherein the conveyor belt is a teethed belt, and the driven roller and the driving roller are provided with meshing teeth that intermesh with the teethed belt.

8. The flame generation assembly according to claim 3, further comprising:

a flame panel;

wherein the ends of the flame panel are provided on the mounting brackets, and the flame panel is provided at the rear side of the reflecting device.

9. The flame generation assembly according to claim 8, wherein the conveyor belt is a teethed belt, and the driven roller and the driving roller are provided with meshing teeth that intermesh with the teethed belt.

10. The flame generation assembly according to claim 3, wherein the conveyor belt is a teethed belt, and the driven roller and the driving roller are provided with meshing teeth that intermesh with the teethed belt.

* * * * *